(12) United States Patent
Hao et al.

(10) Patent No.: US 7,463,084 B2
(45) Date of Patent: Dec. 9, 2008

(54) METHOD AND DEVICE FOR SUPPRESSING VARIATION OF DC LEVEL OF SIGNAL REPRODUCED FROM OPTICAL STORING MEDIA

(75) Inventors: Hsueh-Wu Hao, Jhubei (TW); Kuang-Jung Chang, Taipei (TW)

(73) Assignee: Mediatek Inc. (TW)

( * ) Notice: Subject to any disclaimer, the term of this patent is extended or adjusted under 35 U.S.C. 154(b) by 662 days.

(21) Appl. No.: 11/119,633

(22) Filed: May 2, 2005

(65) Prior Publication Data

US 2005/0251543 A1  Nov. 10, 2005

(30) Foreign Application Priority Data

May 4, 2004  (TW)  .............................. 93112553 A

(51) Int. Cl.
*H03K 5/00* (2006.01)
(52) U.S. Cl. ...................... 327/553; 327/557; 369/53.13

(58) Field of Classification Search ......... 327/551–559; 369/53.1–53.13, 124.1
See application file for complete search history.

(56) References Cited

U.S. PATENT DOCUMENTS

| 4,797,668 | A | * | 1/1989 | Zimmer | .................. | 340/855.6 |
| 5,287,177 | A | * | 2/1994 | Kim | ........................... | 348/169 |
| 6,097,777 | A | * | 8/2000 | Tateishi et al. | ............. | 375/376 |
| 6,594,303 | B1 | * | 7/2003 | Agrawal et al. | ............. | 375/145 |

* cited by examiner

*Primary Examiner*—Dinh T. Le
(74) *Attorney, Agent, or Firm*—Hoffman Warnick LLC

(57) ABSTRACT

The present invention provides a filtering device for high-pass filtering a signal reproduced from an optical data storage medium and a method for the same. More particularly, the present invention provides a device for suppressing the variation of DC level of a quad sum signal or a push-pull signal. The filtering device is adapted to have a higher cutoff frequency for speedily reacting to suppress the DC level change, especially when the pickup head is crossing from the data field to the header field.

19 Claims, 7 Drawing Sheets

METHOD AND DEVICE FOR SUPPRESSING VARIATION OF DC LEVEL OF SIGNAL REPRODUCED FROM OPTICAL STORING MEDIA

BACKGROUND OF THE INVENTION

1. Field of the Invention

The present invention provides a filtering device for filtering a signal reproduced from an optical data storage medium and a method for the same. More particularly, the present invention provides a device for suppressing variation of the DC level of a quad sum signal or a push-pull signal.

2. Description of the Prior Art

Optical data storing devices use the optical method to write digital data into optical data storage medium. In the prior art, optical storage medium are usually some type of disks. The method of storing optical data is to sequentially store digital data onto the data tracks of the disk. To reproduce the digital data of the disk, a pickup head (containing a light detector) emits a laser light onto the optical disk and then receives the reflected laser light from the optical disk. The received laser light is transferred into electrical signals.

In the prior art, the data is recorded sequentially in the disk from inside to outside in a plural concentric circle format or spiral format, and different reflection results are used to differentiate the digital data into 0 or 1. When data is recorded on the disk, it forms a plurality of circular tracks. When the optical data reproducing device reproduces data from the disk, the pickup head follows the tracks to emit laser light onto the disk, and reflected light is generated by the reflection of the laser light according to the different reflection rate produced during recording data on the disk. The light detector of the pickup head receives the reflected laser light from the disk, which is then transferred into electrical signals.

FIG. 1 illustrates a structure of the optical data storage medium and the waveform of the corresponding quad sum signal and push-pull signal. Generally, read/write optical disks of digital audio and video (DVD-RAM) record data in two kinds of storing tracks, land track 81a and groove track 81b. Both kinds of tracks can be used to store data in a set of sectors 82. Each sector 82 includes a header field 82a for carrying address data and a data field 82b for carrying user data. The period (tA,tB) corresponds to the data field of the previous sector. The period (tB,tC) corresponds to the header field of the current sector. The period (tC,tD) corresponds to the data field of the current sector. The address data and user data are formed with pits. Pits in the data field 82b are formed along the central datum within a track. The header field 82a composed of two headers, each physically offset from the other relative to a central datum within a track. The laser light emitted from the pickup head is typically focusing on the central datum of the track. A light detector, located in the pickup head, then receives the reflected laser light from the optical data storage medium, splits the reflected laser light into four quadrants and generates at least four light detection signals denoted by Sa, Sb, Sc, and Sd. Based on these light detection signals, a quad sum signal (Ssum) and a push-pull signal (Spp) is obtained. The Ssum=Sa+Sb+Sc+Sd represents the sum up brightness of the reflected light, and Spp=Sa+Sd−(Sb+Sc) represents the brightness difference between two parts of reflected divided by the centerline. As known by people skilled in the art, Ssum and Spp are important signals while reproducing user data and controlling the DVD-RAM drive. However, the pits have different locations in the header field 82a and data field 82b which leads to different brightness of the reflected light. The different brightness of the reflected light further cause different DC level of signals Ssum and Spp corresponding to header field 82a and data field 82b. The optical data reproducing device should able to adequately remove the difference of the DC level of the signals Ssum and Spp between the header field 82a and the data field 82b so as to correctly reproduce the user data.

SUMMARY OF THE INVENTION

The present invention provides a filtering device for high-pass filtering a signal reproduced from an optical data storage medium and a method for the same. More particularly, the present invention provides a device for suppressing the variation of the DC level of an input signal, which could be a quad sum signal or a push-pull signal. The filtering device is adapted to have a higher cutoff frequency for at least one control period in order to speedily react to suppress the DC level change of the input signal, e.g., due to the pickup head is crossing from the data field to the header field.

The signal filtering device includes a control signal generator and a high-pass filter module. The control signal generator generates a first control signal and a second control signal. The first control signal and the second control signal correspond to a header period and at least one control period, respectively. The high-pass filter module filters the input signal based on a cutoff frequency. The cutoff frequency is adapted according to the first control signal and the second control signal, and the cutoff frequency during the at least one control period is higher than that during the other periods.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides a filtering device for filtering an analog signal reproduced from an optical data storage medium and a method for the same. More particularly, the present invention provides a method for suppressing variation of the DC level of the analog signal. The filtering configuration is adapted to suppress the variation of the DC level of the signal, especially when the pickup head is crossing from the data field to the header field.

Figure 1:
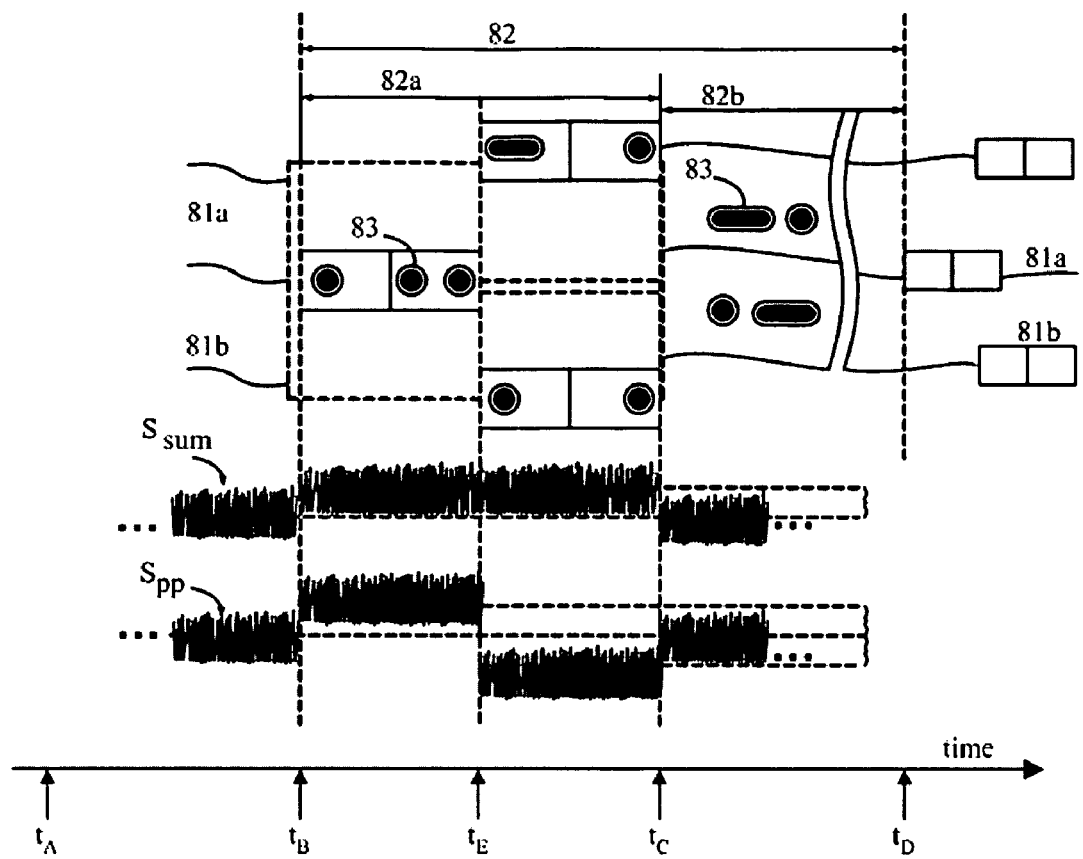
FIG. 1 illustrates a structure of the optical data storage medium and the waveform of the corresponding quad sum signal and push-pull signal.
Figure 2:
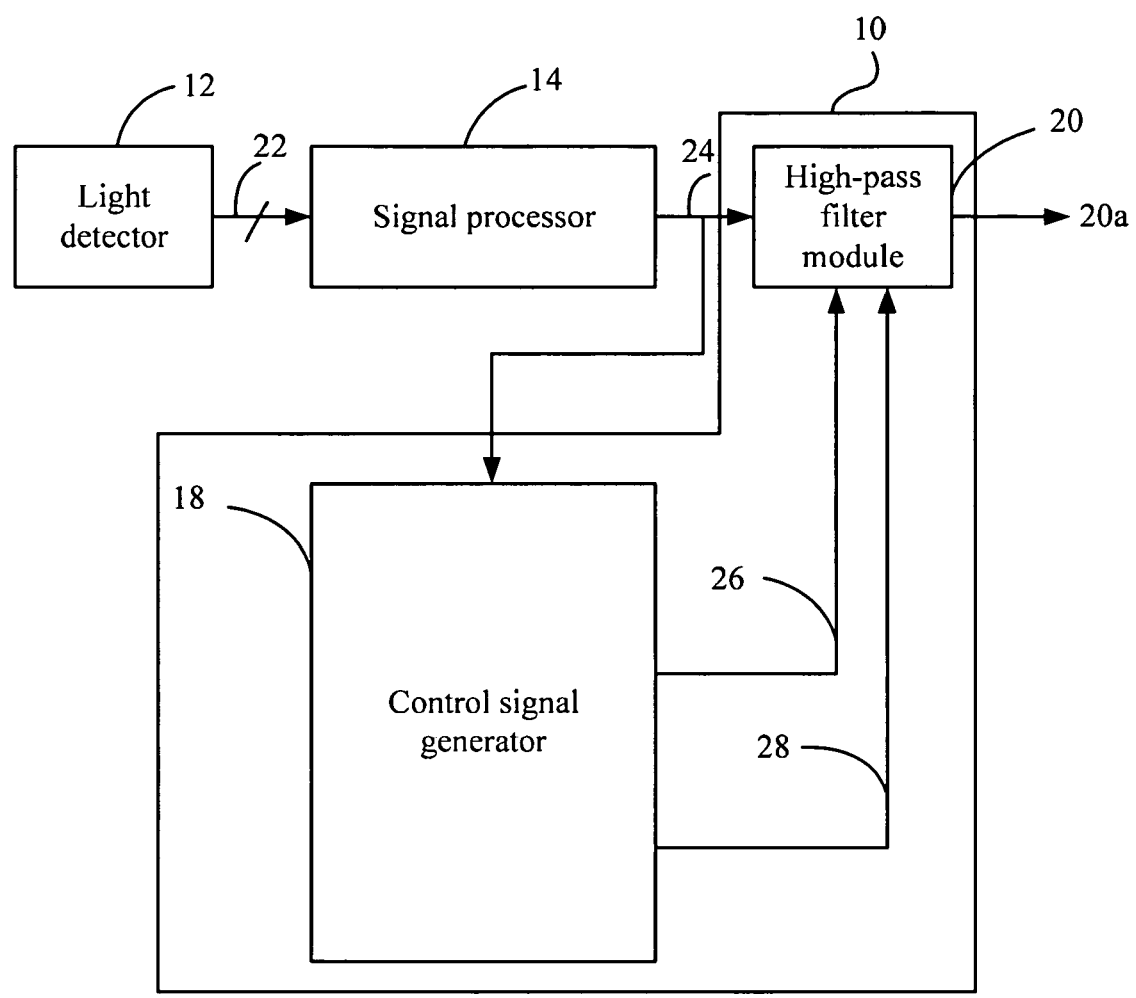
FIG. 2 is the schematic diagram of the optical data reproducing device.

FIG. 2 is the schematic diagram of the optical data reproducing device and the signal filtering device according to the present invention. The optical data reproducing device includes a light detector 12, a signal processor 14, and a signal filtering device 10 of the present invention. In this embodiment of the invention, the signal filtering device 10 includes a control signal generator 18 and a high-pass filter module 20. The light detector 12 is usually located in a pickup head (not shown). The pickup head emits a laser light onto the optical data storage medium (not shown). The light detector 12, located in the pickup head, then receives the reflected laser light from the optical data storage medium, splits the reflected laser light into four quadrants and generates at least four light detection signals 22 denoted by Sa, Sb, Sc, and Sd. The signal processor 14 receives the light detection signals of Sa, Sb, Sc, and Sd and produces a characteristic signal 24. The input signal 24 can be a push-pull signal (Spp) or a quad sum signal (Ssum). The Ssum is given by Ssum=Sa+Sb+Sc+Sd. The Spp is obtained by Spp=Sa+Sd−(Sb+Sc). The control signal generator 18 receives the input signal 24 for generating a first control signal 26 and a second control signal 28, which respectively indicates the header period and a control period.

Figure 3A:
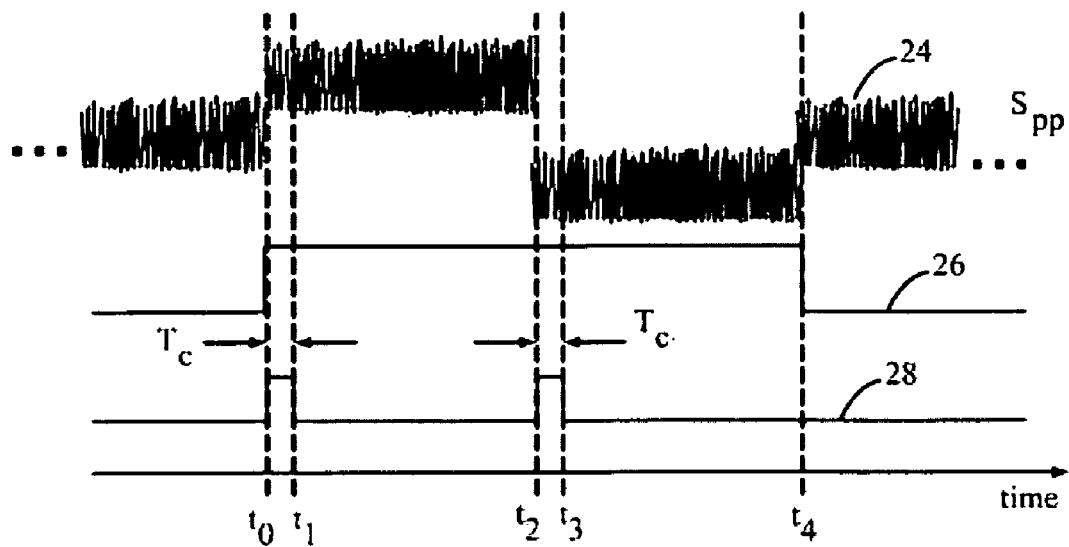
FIG. 3(a) is a diagram of signal waveforms of the push-pull signal, the first control signal, and the second control signal.

FIG. 3(a) is a diagram of the signal waveforms of the signal 24, the first control signal 26, and the second control signal 28 for the case of the input signal 24 is the push-pull signal (Spp). The control signal generator 18 detects and traces input signal 24, and periodically generates the first control signal 26. The first control signal 26 will start at a LOW state, and becomes a HIGH state at a time point substantially equaling to the time point tB, and lasts along till a time point substantially equaling to the time point tC. On the other hand, the control signal generator 18 further generates a second control signal 28, according to the first control signal 26. Therefore, the second control signal 28 changes from the LOW state to the HIGH state at time points which is close to tB and tE, and lasts for a predetermined control period.

Figure 3B:
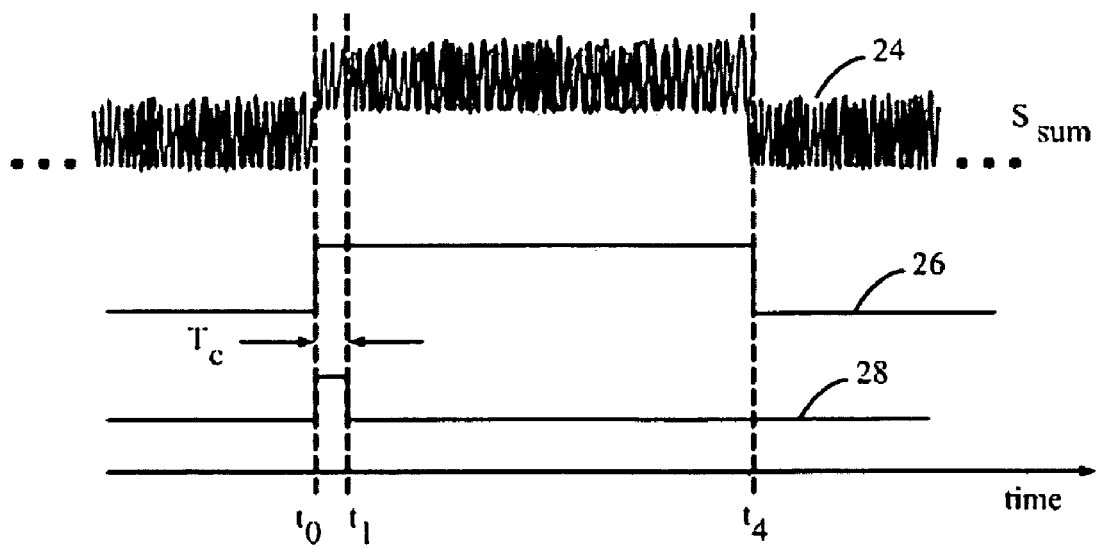
FIG. 3(b) is a diagram of signal waveforms of the quad sum signal, the first control signal, and the second control signal.
Figure 4:
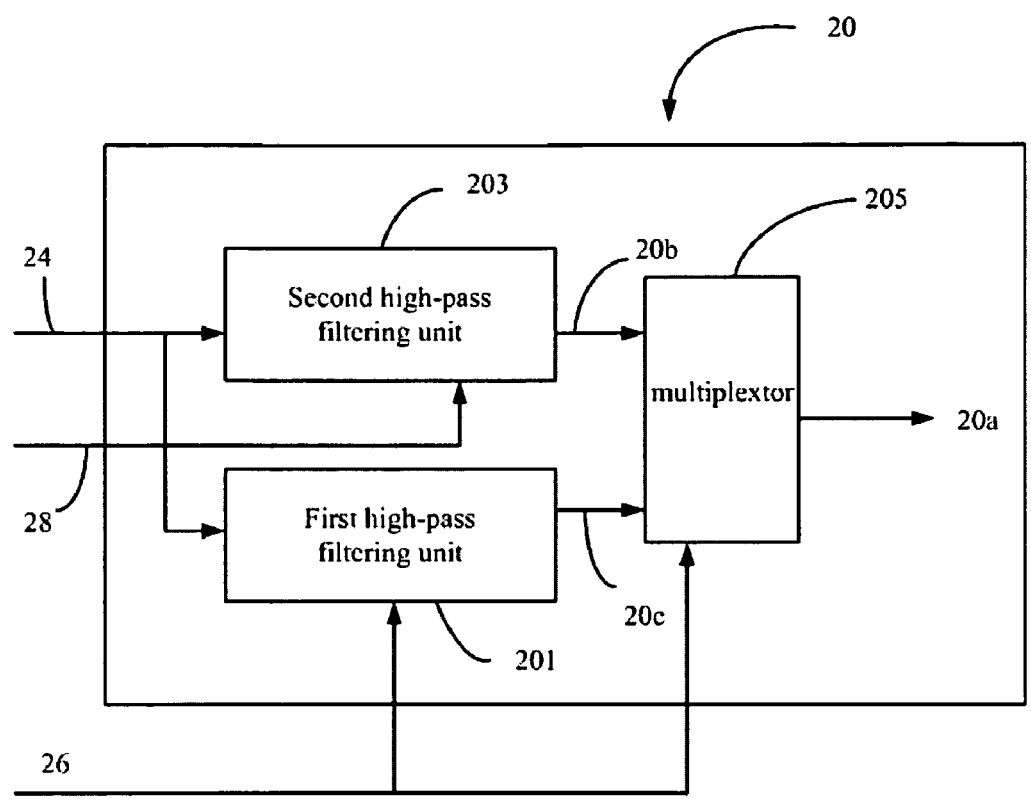
FIG. 4 is a functional block diagram of the embodiment of a signal filtering device of the invention.

FIG. 3(b) is a diagram of the signal waveforms of the input signal 24, the first control signal 26, and the second control signal 28 for the case of the input signal 24 being the quad sum signal (Ssum). The control signal generator 18 will detect input signal 24, and periodically generates the first control signal 26. The first control signal 26 will start at the LOW state, and becomes a HIGH state at t0 substantially equaling to the time point tB, and lasts along till a time point substantially equaling to the time point tC. On the other hand, the control signal generator 18 further generates the second control signal 28 according to the first control signal 26. Therefore, the second control signal 28 changes from the LOW state to the HIGH state at time t0 which is close to tB, and lasts for a predetermined control period. FIG. 4 is a diagram of one embodiment of a high-pass filter module 20 of the invention. The high-pass filter module 20 includes a first high-pass filtering unit 201, a second high-pass filtering unit 203, and a multiplexer 205.

The first high-pass filtering unit 201 is used for filtering the input signal 24 under the control of the first control signal 26. When the first control signal 26 is at the LOW state, the first high-pass filtering unit is a high pass filter for the input signal 24 and generates a first filtered signal 20c. In this case, the cutoff frequency equals to a value fa (e.g. fa=8 Hz). When the first control signal 26 is at the HIGH state, the first high-pass filtering unit acts as a signal level keeper. At this time, the signal level of the first filtered signal 20c is being kept by a capacitor. This signal level is to be a good initial signal level for resuming the high-pass filtering operation of the first high-pass filtering unit 201. This is one of the advantages of the present invention.

The second high-pass filtering unit 203 is used for filtering the input signal 24 under the control of the second control signal 28 to output a second filtered signal 20b. The second high-pass filtering unit 203 is a high pass filter which has variable cut-off frequency. Under the control of the second control signal 28, the second high-pass filtering unit 203 could be adapted to have low cutoff frequency or a high cutoff frequency. When the second control signal 28 is at the LOW state, the second high-pass filtering unit 203 has a second cutoff frequency (fb, e.g. fb=1 Hz); when the second control signal 28 is at the HIGH state, the second high-pass filtering unit 203 has a third cutoff frequency (fc, e.g. fc=500 kHz). As described above, the first cutoff frequency fa and the second frequency fb are usually low. The third cutoff frequency fc is higher than the first cutoff frequency fa and the second cutoff frequency fb. Besides, the first cutoff frequency can be equal to the second cutoff frequency, and that will not hinder the application of the embodiment of the invention.

The multiplexer 205 is used for receiving the first filtered signal 20c, the second filtered signal 20b, and the first control signal 26 to generate the output signal 20a. When the first control signal 26 is at the LOW state, the multiplexer 205 selects the first filtered signal 20c to be the output signal 20a; otherwise, when the first control signal 26 is at the HIGH state, the multiplexer 205 selects the second filtered signal 20b to be the output signal 20a.

Figure 5:
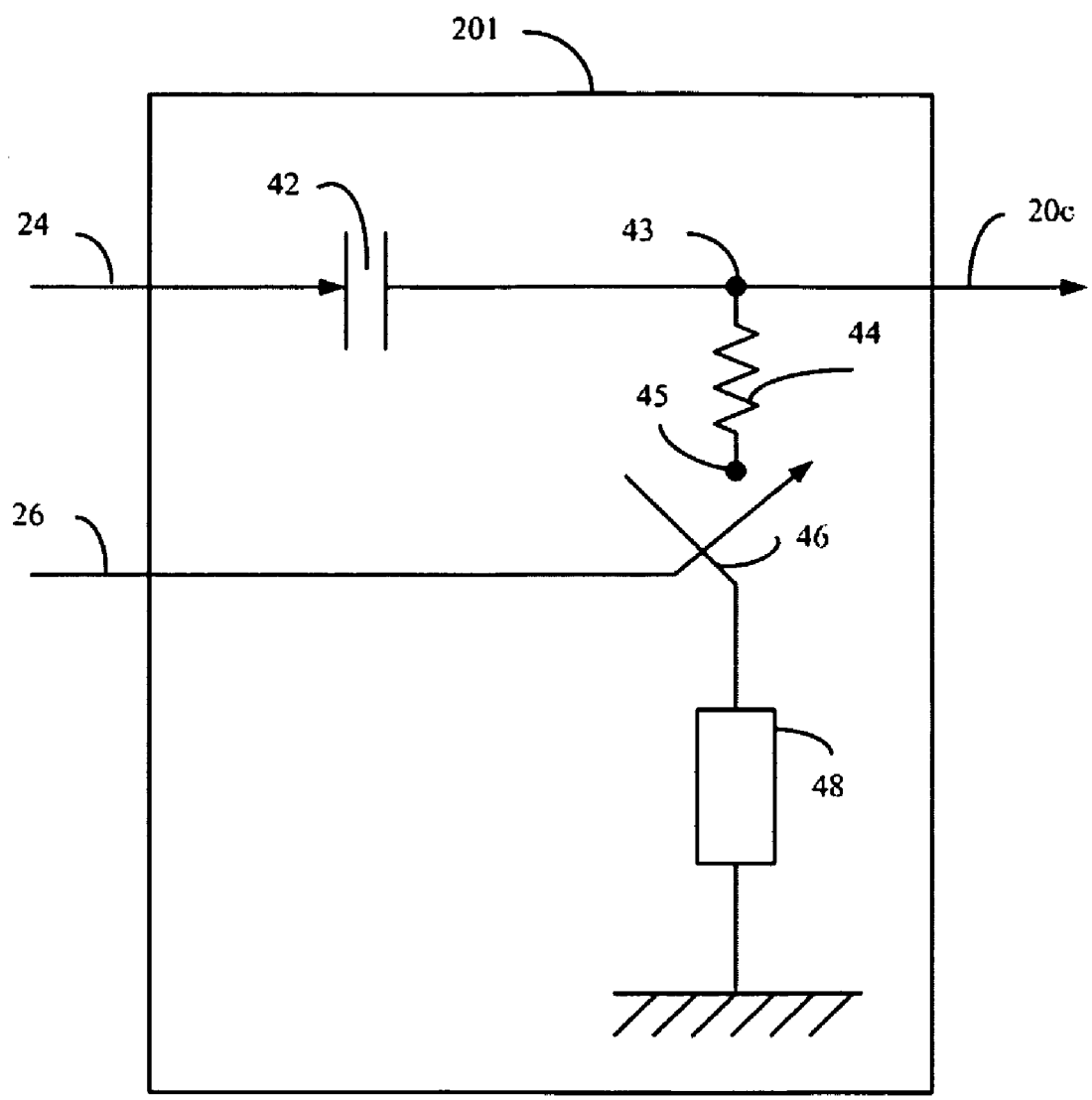
FIG. 5 is a functional block diagram of the embodiment of the first high-pass filtering unit of the invention.

FIG. 5 is a schematic diagram of one embodiment of the first high-pass filtering unit 201 of the invention. The first high-pass filtering unit 201 includes a first capacitor 42, a first resistor 44, a first switch 46, and a first offset voltage unit 48. One terminal of the first capacitor 42 receives the input signal 24, and another terminal connects to a first node 43. One terminal of the first resistor 44 connects to the first node 43, and another terminal connects to a second node 45. One terminal of the first switch 46 connects to the second node 45, and another terminal connects to a constant voltage node to provide a DC level to the output signal. The constant voltage node is provided by the constant voltage unit 48. For some cases, the constant voltage node is a ground node. The signal at the first node 43 serves as the first filtered signal 20c. The first switch 46 is controlled by the first control signal 26. When the first control signal 26 is at LOW state, the first switch 46 is closed; otherwise, when the first control signal 26 is at a HIGH state, the first switch 46 is open. When the first switch 46 is closed, the first capacitor 42 and the first resistor 44 together serve as a high pass filter for filtering the input signal 24. When the first switch 46 is open (the first point 43 and the multiplexer 205 also in an open state), it will cause that the first capacitor 42 floats for maintaining the signal level of the first filtered signal 20c.

Figure 6:
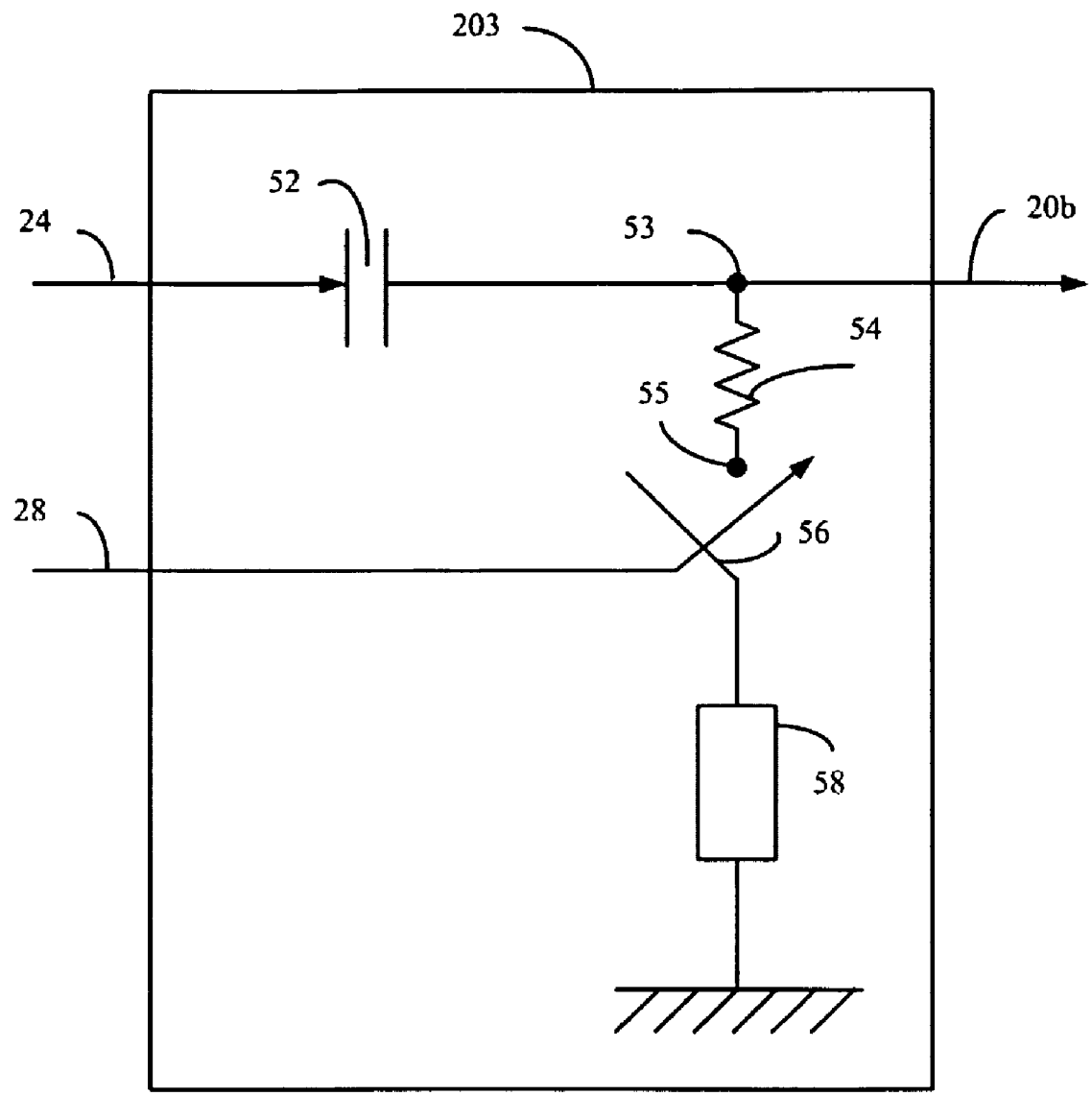
FIG. 6 is a functional block diagram of the embodiment of the second high-pass filtering unit of the invention.

FIG. 6 is a schematic diagram of the embodiment of the second high-pass filtering unit 203 of the invention. The second high-pass filtering unit 203 includes a second capacitor 52, a second resistor 54, a second switch 56, and a second offset voltage unit 58. One terminal of the second capacitor 52 receives the input signal 24, and another terminal connects to a third node 53. One terminal of the second resistor 54 connects to the third node 53, and another terminal connects to a fourth node 55. One terminal of the second switch 56 connects to the fourth node 55, and another terminal connects to a constant voltage node to providing a DC level to the output signal. The constant voltage node is provided by the constant voltage unit 58. For some cases, the constant voltage node is a ground node. The signal at the third node 53 serves as the second filtered signal 20b. The second switch 56 is controlled by the second control signal 28. When the second control signal 28 is at a LOW state, the second switch 56 is closed; otherwise, when the second control signal 28 is at a HIGH state, the second switch 56 is open. When the second switch 56 is closed, the second capacitor 52 and the second resistor 54 together serve as a high pass filter for filtering the input signal 24. When the second switch 56 is open (the second point 53 and the multiplexer 205 are still connected), the second capacitor 52 will serve as another high pass filter for filtering the input signal 24.

Figure 7:
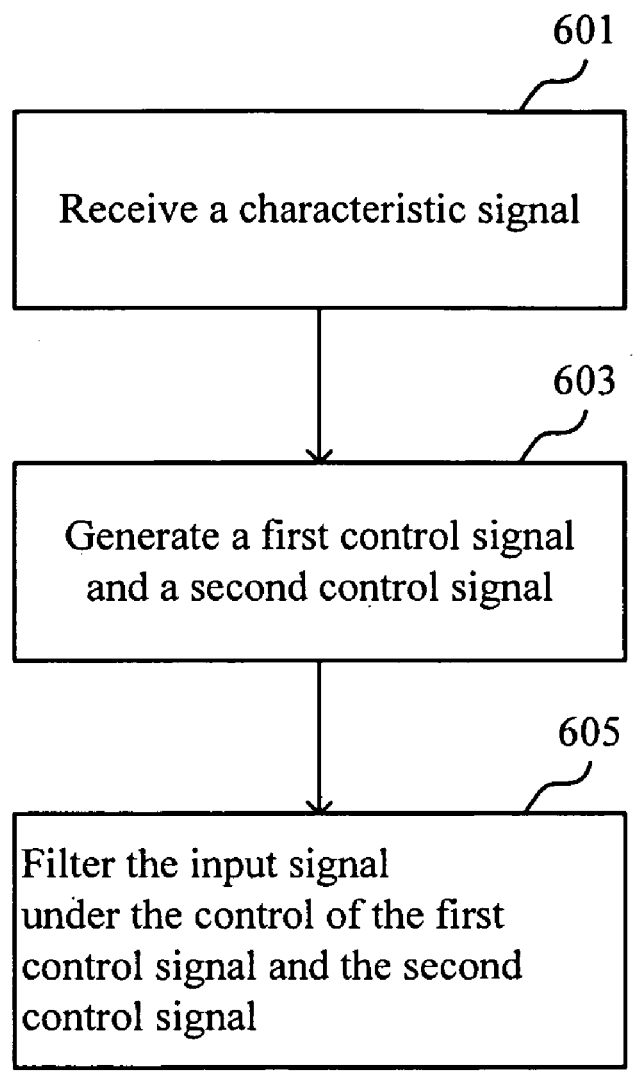
FIG. 7 is a flow chart of the embodiment of the signal filtering method of the invention.

FIG. 7 is a flow chart of the embodiment of the signal filtering method of the invention. The present invention further provides a signal filtering method for suppressing the variation of a DC level of the input signal, especially when the pickup head is crossing the data field to the header field. The signal filtering method includes the following steps:

Step 601: receiving an input signal, which could be a quad sum signal or a push-pull signal;
Step 603: generating a first control signal and a second control signal; and
Step 605: filtering the input signal under the control of the first control signal and the second control signal.

The input signal of Step 601 can be a push-pull signal (Spp) or a quad sum signal (Ssum). In step 603, the first control signal is at the HIGH state, indicating that the present input signal corresponds to the header field; otherwise, when the signal is in the LOW state, it indicates that the input signal corresponds to the data field. The second control signal corresponds to at lease on control period whose starting time point is close to the time point at which the DC level of the input signal is changed, e.g., due to the pickup head is crossing from the data field to the header field. In step 605, when the input signal is being high-pass filtered, the cutoff frequency used in the HIGH period of the second control signal is higher than that in the other periods, so as to speedily react to suppress the DC level change of the input signal.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A signal filtering device for suppressing the variation of a DC level of an input signal to generate an output signal, the input signal being received from an optical data storage medium during three periods $(t_A,t_B)$, $(t_B,t_C)$, $(t_C,t_D)$, the period $(t_A,t_B)$ corresponding to a data field of a previous sector in the optical data storage medium, the period $(t_B, t_C)$ corresponding to a header field of a current sector in the optical data storage medium, the period $(t_C,t_D)$ corresponding to a data field of a current sector in the optical data storage medium, the DC level of the input signal in the period $(t_A,t_B)$ being substantially the same as that in the period $(t_C,t_D)$, the DC level of the input signal in the period $(t_A,t_B)$ being different from that of the input signal in the period $(t_B,t_C)$, said signal filtering device comprising:
a control signal generator for generating a first control signal and a second control signal, the first control signal and the second control signal corresponding to the period $(t_B,t_C)$ of the input signal and a control period $(t_0,t_1)$, respectively, wherein t0 is a value close to $t_B$;
a high-pass filter module with a cutoff frequency for filtering the input signal to generate the output signal, the cutoff frequency being determined according to the first and second control signals, and the cutoff frequency for the control period $(t_0,t_1)$ being higher than that for the other periods.

2. The signal filtering device of claim 1, wherein the input signal is a quad sum signal.

3. The signal filtering device of claim 1, wherein the input signal is a push-pull signal.

4. The signal filtering device of claim 1, wherein the high-pass filter module comprises:
a first high-pass filtering unit for generating a first filtered signal based on the input signal and the first control signal, wherein the first high-pass filtering unit filters the input signal with a first cutoff frequency if the first control signal is at a first state, and the first high-pass filtering unit substantially keeps the signal level of the first filtered signal if the first control signal is at a second state;
a second high-pass filtering unit for generating a second filtered signal based on the input signal and the second control signal, wherein the second high-pass filtering unit filters the input signal with a second cutoff frequency if the second control signal is at the first state, and the second high-pass filtering unit filters the input signal with a third cutoff frequency if the second control signal is at the second state; and
a multiplexer for receiving the first filtered signal and the second filtered signal, and selecting the first filtered signal or the second filtered signal as the output signal according to the first control signal, wherein the first filtered signal is selected as the output signal if the first control signal is at the first state, and the second filtered signal is selected as the output signal if the first control signal is at the second state;
wherein a period of the second state of the first control signal substantially equals to the period $(t_B,t_C)$ of the input signal, a period of the second state of the second control signal equals to $(t_0,t_1)$, and the third cutoff frequency is higher than the first cutoff frequency and the second cutoff frequency.

5. The signal filtering device of claim 4, wherein the first cutoff frequency is set to be equal to the second cutoff frequency.

6. The signal filtering device of claim 4, wherein the first high-pass filtering unit having an input terminal and an output terminal comprises:
a first capacitor connecting between the input terminal and a first node connecting to the output terminal;
a first resister connecting between the first node and a second node; and
a first switch, controlled by the first control signal, connecting between the second node and a constant voltage node, wherein the first switch is closed if the first control signal is at the first state, otherwise the first switch is open.

7. The signal filtering device of claim 4, wherein the second high-pass filtering unit having an input terminal and an output terminal comprises:
a second capacitor connecting between the input terminal and a third node connecting to the output terminal;
a second resister connecting between the third node and a fourth node; and
a second switch, controlled by the second control signal, connecting between the fourth node and a constant voltage node, wherein the second switch is open if the second control signal is at the first state, otherwise the second switch is closed.

8. A signal filtering device for suppressing the variation of a DC level of an input signal to generate an output signal, the input signal being received from an optical data storage medium during three periods $(t_A,t_B)$, $(t_B,t_C)$, $(t_C,t_D)$, the period $(t_A,t_B)$ corresponding to a data field of a previous sector in the optical data storage medium, the period $(t_B,t_D)$ corresponding to a header field of a current sector in the optical data storage medium, the period $(t_C,t_D)$ corresponding to a data field of a current sector in the optical data storage medium, the period $(t_B,t_C)$ further comprising M periods $(t_B,t_{E,1})$, $(t_{E,1},t_{E,2})$, ..., $(t_{E,M-2},t_{E,M-1})$, and $(tE_{,M-1},t_C)$, the DC level of the input signal in the period $(t_A,t_B)$ being substantially the same as that in the period $(t_C,t_D)$, the DC level of the input signal in each period being different from that of the input signal in the preceding period, said signal filtering device comprising:
    a control signal generator for generating a first control signal and a second control signal, the first control signal corresponding to the period $(t_B,t_C)$ of the input signal, the second control signal corresponding to M control periods $(t_{0,1},t_{1,1})$, ..., $(t_{0,M},t_{1,M})$ such that $t_{0,1}$ is a value close to $t_B$, and $t_{0,i}$ is a value close to $t_{E,i}$ for $1<=i<=M-1$;
    a high-pass filter module with a cutoff frequency for filtering the input signal to generate the output signal, the cutoff frequency of the high-pass filter module being determined according to the first control signal and the second control signal, and the cutoff frequency for the control periods being higher than that for the other periods.

9. The signal filtering device of claim 8, wherein the input signal is a quad sum signal.

10. The signal filtering device of claim 8, wherein the input signal is a push-pull signal.

11. The signal filtering device of claim 8, wherein the high-pass filter module comprises:
    a first high-pass filtering unit for generating a first filtered signal based on the input signal and the first control signal, wherein the first high-pass filtering unit filters the input signal with a first cutoff frequency if the first control signal is at a first state, and the first high-pass filtering unit substantially keeps the signal level of the first filtered signal if the first control signal is at a second state;
    a second high-pass filtering unit for generating a second filtered signal based on the input signal and the second control signal, wherein the second high-pass filtering unit filters the input signal with a second cutoff frequency if the second control signal is at the first state, and the second high-pass filtering unit filters the input signal with a third cutoff frequency if the second control signal is at the second state; and
    a multiplexer for receiving the first filtered signal and the second filtered signal, and selecting the first filtered signal or the second filtered signal as the output signal according to the first control signal, wherein the first filtered signal is selected as the output signal if the first control signal is at the first state, and the second filtered signal is selected as output signal if the first control signal is at the second state;
    wherein a period of the second state of the first control signal substantially equals to the period $(t_B,t_C)$ of the input signal, the periods of the second state of the second control signal equal to the control periods, and the third cutoff frequency is higher than the first cutoff frequency and the second cutoff frequency.

12. The signal filtering device of claim 11, wherein the first cutoff frequency is set to be equal to the second cutoff frequency.

13. The signal filtering device of claim 11, wherein the first high-pass filtering unit having an input terminal and an output terminal comprises:
    a first capacitor connecting between the input terminal and a first node connecting to the output terminal;
    a first resister connecting between the first node and a second node; and
    a first switch, controlled by the first control signal, connecting between the second node and a constant voltage node, wherein the first switch is closed if the first control signal is at the first state, otherwise the first switch is open.

14. The signal filtering device of claim 11, wherein the second high-pass filtering unit having an input terminal and an output terminal comprises:
    a second capacitor connecting between the input terminal and a third node connecting to the output terminal;
    a second resister connecting between the third node and a fourth node; and
    a second switch, controlled by the second control signal, connecting between the fourth node and a constant voltage node, wherein the second switch is open if the second control signal is at the first state, otherwise the second switch is closed.

15. A signal filtering method for suppressing the variation of a DC level of an input signal to generate an output signal, the input signal being received from an optical data storage medium during three periods $(t_A,t_B)$, $(t_B,t_C)$, $(t_C,t_D)$, the period $(t_A,t_B)$ corresponding to a data field of a previous sector in the optical data storage medium, the period $(t_B,t_C)$ corresponding to a header field of a current sector in the optical data storage medium, the period $(t_C,t_D)$ corresponding to a data field of a current sector in the optical data storage medium, the DC level of the input signal in the period $(t_A,t_B)$ being substantially the same as that of the input signal in the period $(t_C,t_D)$, the DC level of the input signal in the period $(t_A,t_B)$ being different from that of the input signal in the $(t_{B,C})$, said signal filtering method comprising:
    (a) generating a first control signal and a second control signal, the first control signal corresponding to the period $(t_B,t_C)$ of the input signal, the second control signal corresponding to a control period $(t_0,t_1)$ wherein t0 is a value close to $t_B$;
    (b) high-pass filtering the input signal with a cutoff frequency to generate the output signal, the cutoff frequency being determined according to the first control signal and the second control signal, and the cutoff frequency for the control period $(t_0,t_1)$ being higher than that for the other periods.

16. The method of claim 15, comprising;
    high-pass filtering the input signal with a first cutoff frequency if the first control signal and the second control signal are at a first state;
    high-pass filtering the input signal with a second cutoff frequency if the first control signal is at a second state and the second control signal is at the first state; and
    high-pass filtering the input signal with a third cutoff frequency if the second control signal is at the second state, the third cutoff frequency is higher than the first cutoff frequency and the second cutoff frequency.

17. The method of claim 16, wherein the first cutoff frequency equals to the second cutoff frequency.

18. A signal filtering method for suppressing the variation of a DC level of an input signal to generate an output signal, the input signal being received from an optical data storage medium during three periods $(t_A,t_B)$, $(t_B,t_C)$, $(t_C,t_D)$, the period (tA,tB) corresponding to a data field of a previous sector in the optical data storage medium, the period (tB,tC) corresponding to a header field of a current sector in the optical data storage medium, the period (tC,tD) corresponding to a data field of a current sector in the optical data storage medium, the period $(t_B,t_C)$ further comprising M periods $(t_B,$ $t_{E,1}$), $(t_{E,1}, t_{E,2}) \ldots (t_{E,M-2}, t_{E,M-1})$, and $(t_{E,M-1}, t_C)$, the DC level of the input signal in the period $(t_A, t_B)$ being substantially the same as that of the input signal in the period $(t_C, t_D)$, the DC level of the input signal in each period being different from that of the input signal in the preceding period, said signal filtering method comprising:

(a) generating a first control signal and a second control signal, the first control signal corresponding to the period $(t_B, t_C)$ of the input signal and the second control signal corresponding to M Control periods $(t_{0,1}, t_{1,1}), \ldots (t_{0,M}, t_{1,M})$ such that $t_{0,1}$ is a value close to $t_B$, and $t_{0,i}$ is a value close to $t_{E,i}$ for $1<=i<=M-1$;

(b) high-pass filtering the input signal with a cutoff frequency to generate the output signal, the cutoff frequency being determined according to the first control signal and the second control signal, and the cutoff frequency for the control periods being higher than that for the other periods.

19. The method of claim 18, comprising:

high-pass filtering the input signal with a first cutoff frequency if the first control signal and the second control signal are at a first state;

high-pass filtering the input signal with a second cutoff frequency if the first control signal is at a second state and the second control signal is at the first state; and high-pass filtering the input signal with a third cutoff frequency if the second control signal is at the second state, and the third cutoff frequency is higher than the first cutoff frequency and the second cutoff frequency.

* * * * *

UNITED STATES PATENT AND TRADEMARK OFFICE
CERTIFICATE OF CORRECTION

PATENT NO. : 7,463,084 B2 Page 1 of 1
APPLICATION NO. : 11/119633
DATED : December 9, 2008
INVENTOR(S) : Hsueh-Wu Hao and Kuang-Jung Chang It is certified that error appears in the above-identified patent and that said Letters Patent is hereby corrected as shown below:

Column 6:
In Claim 8, line 6: "(tB,tD)" should be --(tB,tC)--

Column 8:
In Claim 15, line 13: "(tB,C)" should be --(tB,tC)--

Signed and Sealed this

Sixteenth Day of June, 2009

JOHN DOLL
*Acting Director of the United States Patent and Trademark Office*